United States Patent [19]

Pierrot et al.

[11] 4,384,290
[45] May 17, 1983

[54] AIRBORNE INTERROGATION SYSTEM

[75] Inventors: Robert Pierrot; Francois Gautier; Pierre Crochet, all of Paris, France

[73] Assignee: Thomson-CSF, Paris, France

[21] Appl. No.: 143,336

[22] Filed: Apr. 24, 1980

[30] Foreign Application Priority Data

Apr. 26, 1979 [FR] France ................. 79 10648

[51] Int. Cl.³ .............. G01S 13/86; H01Q 3/26; H01Q 1/42
[52] U.S. Cl. .................. 343/6 A; 244/3.19; 343/854; 343/872
[58] Field of Search ......... 343/872, 873, 876, 55 A, 343/6 A, 854; 244/3.19

[56] References Cited

U.S. PATENT DOCUMENTS

| 2,624,843 | 1/1953 | Redheffer | 343/872 X |
| 3,083,360 | 3/1963 | Welty et al. | 343/100 SA X |
| 3,623,109 | 11/1971 | Neumann | 343/876 X |
| 3,680,113 | 7/1972 | Dorier et al. | 343/876 X |
| 3,697,994 | 10/1972 | O'Daniel | 343/100 SA X |
| 3,699,574 | 10/1972 | O'Hara et al. | 343/100 SA X |
| 3,731,315 | 5/1973 | Sheleg | 343/854 |
| 3,736,592 | 5/1973 | Coleman | 343/854 |
| 3,789,417 | 1/1974 | Coleman | 343/854 X |
| 3,827,055 | 7/1974 | Bogner et al. | 343/876 X |
| 3,836,978 | 9/1974 | Overbury | 343/876 X |
| 3,922,685 | 11/1975 | Opas | 343/876 X |
| 3,975,737 | 8/1976 | Jones, Jr. et al. | 343/872 X |
| 3,975,738 | 8/1976 | Pelton et al. | 343/872 |
| 4,108,400 | 8/1978 | Groutage et al. | 244/3.19 X |

Primary Examiner—Malcolm F. Hubler
Attorney, Agent, or Firm—Oblon, Fisher, Spivak, McClelland & Maier

[57] ABSTRACT

The system according to the invention utilizes a transmission—reception radar antenna protected by a radome and an interrogation antenna having at least one set of two networks engaged laterally on the outer wall of the radome. The networks are arranged symmetrically to an axis of revolution of the radome. Supply means supply the interrogation antenna with an ultra-high frequency interrogation signal and the switching and phase-displacement means and the networks constitute an electronic scanning antenna.

15 Claims, 6 Drawing Figures

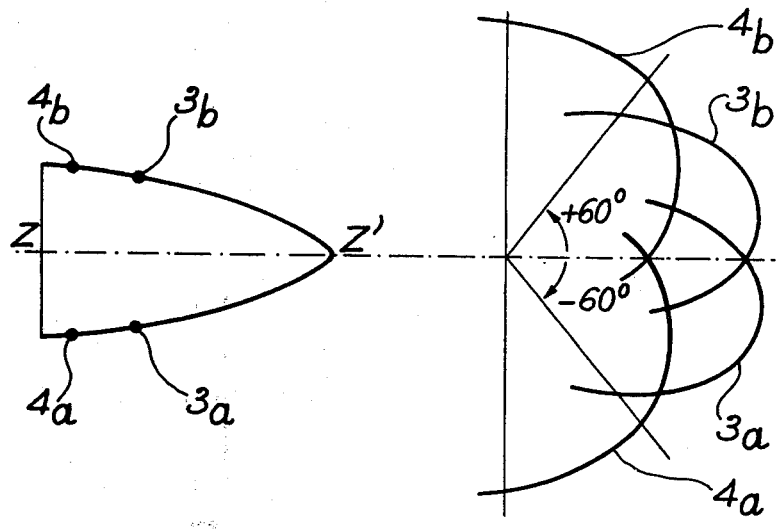
FIG. 3a
FIG. 3b
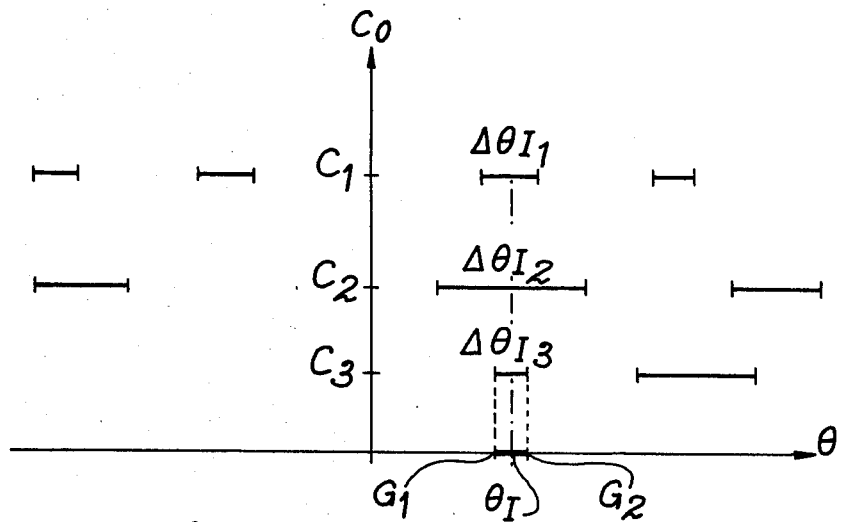
FIG. 4 ively with respect to the axis of revolution of the radome, means supplying a microwave interrogation signal to the interrogation antenna, means for switching and phase shifting the interrogation signal and the radiating elements constitute an electronic scanning antenna.

The interrogating system according to the invention can in particular be used for any transmitter-receiver radar.

AIRBORNE INTERROGATION SYSTEM

BACKGROUND OF THE INVENTION

Field of the Invention

The present invention relates to an interrogation system for an airborne radar and a radar incorporating such a system.

Description of the Prior Art

In modern combat aircraft, it is now necessary to associate to the main search and tracking radar an interrogation system, known as identification friend or foe (IFF) interrogator, for making it possible to identify detected targets. It is therefore necessary to install two antennas in the nose of the aircraft.

A known solution consists of fitting the radar antenna and the interrogator antenna in such a way that there is minimum jamming between both antennas. According to a known solution, dipoles in vertical polarization for IFF transmission-reception are arranged in front of a slot antenna, a parabola, a non-deformable Cassegrain antenna radiating in horizontal polarization. The two antennas are mechanically connected and are therefore pointed and stabilized simultaneously. In this case, the protective radome of the antennas is adapted, for each frequency band of the radar signal and interrogation signal, by a network of conductor wires for the IFF band.

Although this solution is suitable for the interrogation signal, it leads to a reduction in radar preformance, a loss of gain and a rise in the relative levels of the minor lobes of the radar due to the interaction with the IFF dipoles and the network of radome adapting wires.

In the case of antennas having a rotating polarizer mirror, there is another possible solution for fitting the antennas, but this solution cannot be used for all antenna types and in the case of a Cassegrain antenna with a rotating polarizer mirror the perturbation caused by the IFF dipoles is unacceptable.

BRIEF SUMMARY OF THE INVENTION

The present invention aims at overcoming the disadvantages referred to hereinbefore and relates to an interrogation system for an airborne radar in which the antenna of the interrogator can be used with any type of radar antenna.

Another object of the present invention is a radar interrogation system for which the adapting wires of the radome are eliminated.

Another object of the present invention is a radar interrogation system in which the reactions between the radar antenna and the interrogator antenna are eliminated.

According to the invention, the airborne interrogation system comprises a transmission-reception radar antenna enclosed in a radome. The interrogation antenna comprises at least one pair of two radiating elements arranged laterally on the nose of the aircraft symmetrically with respect to the axis of revolution of the radome, means supplying a microwave interrogation signal to the interrogation antenna, means for switching and phase shifting the interrogation signal and the radiating elements constitute an electronic scanning antenna.

The interrogating system according to the invention can in particular be used for any transmitter-receiver radar.

BRIEF DESCRIPTION OF THE DRAWINGS

The invention is described in greater detail hereinafter relative to non-limitative embodiments and the attached drawings, wherein show:

FIGS. 3a and 3b in diagrammatic form, the arrangement of the interrogation antenna in the bearing plane and the elementary beams of the corresponding radiating elements constituting the antenna in this plane.

FIG. 4 an explanatory diagram of the combination of the elementary beams for eliminating the ambiguity of the interrogation.

DETAILED DESCRIPTION OF THE PREFERRED EMBODIMENTS

Figure 1A:
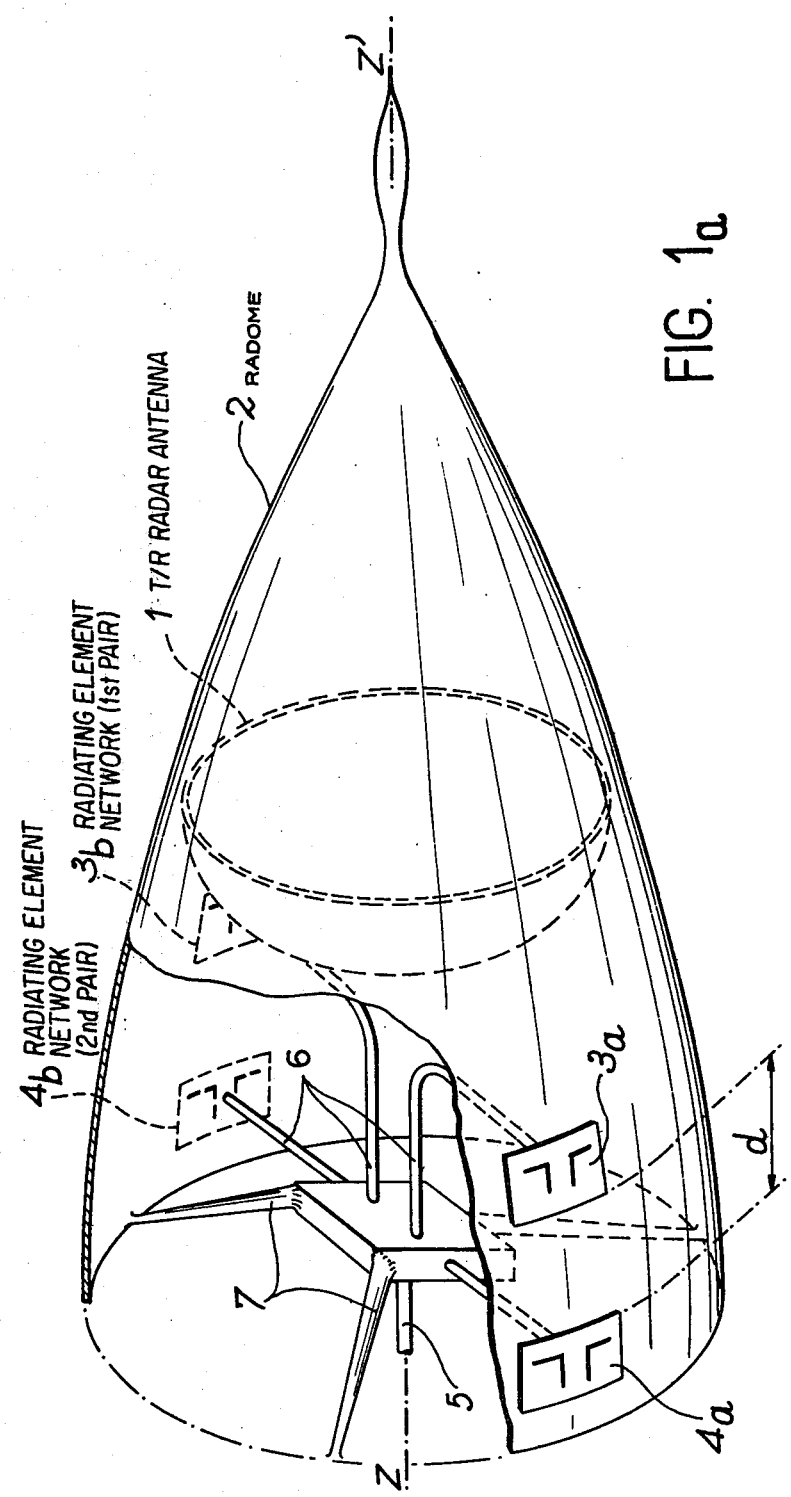
FIG. 1a a view of the interrogation antenna according to the invention.
Figure 1B:
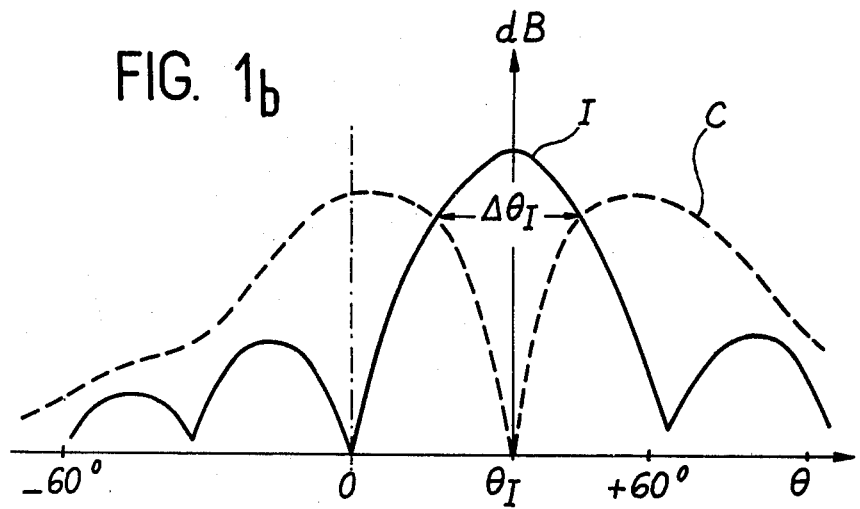
FIG. 1b a radiation diagram in the bearing plane of the interrogation antenna according to the invention.
Figure 2:
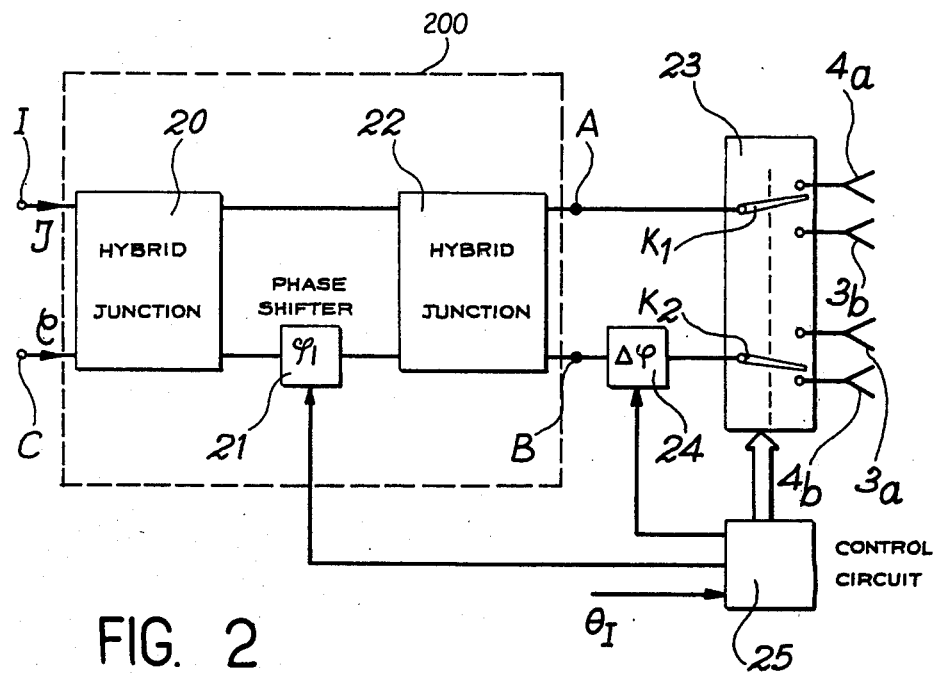
FIG. 2 a constructional detail of switching and phase-shifting means of the interrogation antenna according to the invention.

According to FIG. 1a, the airborne interrogation system according to the invention comprises a transmission-reception radar antenna 1 protected by a radome 2. The interrogation system according to the invention also comprises an interrogation antenna having at least one pair of radiating elements such as 3a and 3b arranged symmetrically with respect to an axis of revolution Z, Z' of the radome. The networks constituting the interrogation antenna are arranged behind the transmission-reception radar antenna 1. Supply means 5 supply the interrogation antenna with a microwave frequency interrogation signal via means 6 for switching and phase-shifting means the interrogation signal. The switching and phase-shifting means 6 of the interrogation signal and the radiating elements constitute an electronic scanning antenna. According to FIG. 1, the interrogation antenna also comprises, associated to the first pair, a second pair of radiating elements 4a, 4b arranged laterally on the nose of the aircraft on the same guidelines as the radiating elements of the first pair and apart therefrom with such a distance that the grating lobes are suppressed. According to FIG. 1a, first and second pairs of radiating elements arranged on the outer wall of the actual radome. However, the embodiment of FIG. 1a is not prejudicial to any differing construction in which, particularly due to cumbersomeness the second pair of radiating elements is arranged directly on the wall of the carrying aircraft. In such a case and without passing beyond the scope of the invention, the of the second pair are embedded in the metal wall of the aircraft or the supporting ferrule of the radome. In all these cases, the two sets are arranged symmetrically with respect to the axis of revolution Z, Z' of the radome and are preferably oriented in a direction parallel to the reference plane, such as for example the bearing plane. The device according to the invention operates in the following manner, bearing in mind the operating principles of the IFF. On transmission at a frequency of 1030 MHz, a train of pulses is transmitted in accordance with a known code alternately to an interrogation channel, whereof the orientation of the transmission beam is linked with that of the radar antenna, and a control channel whose wide transmission beam covers the side lobes of the interrogation beam. The operation of the responder of the interrogated aircraft can be summarized by saying that if the interrogation pulses received exceed by 9 dB the control pulse, there must be an answer in 90% of cases. If the interrogation pulse is below the control pulse, there must be no answer in more than 10% of cases. These conditions define an almost certain interrogation arc by regrouping the interrogation and control beams increased by 9 dB. This operating method makes it possible to limit the responses caused by the different IFF interrogators working in the same zone. On reception of the signal transmitted by the responder at a frequency of 1090 MHz, the simultaneous formation of a normal reception channel and optionally an auxiliary reception channel only makes it possible to take account of the signal received if the reception level on the normal channel exceeds by a certain given quantity the level on the auxiliary channel. This condition makes it possible to eliminate the responses received by responders interrogated by other IFF interrogation systems. Control on transmission cooperates with the discretion of the IFF system and satisfies itself with non-simultaneous channels, whilst control on reception increases the efficiency of IFF processing by limiting the response to then be processed, but requires two simultaneous channels. According to the invention, the radiating elements have different radiation diagrams which overlap in pairs, each network radiating in accordance with a broad diagram and making it possible to observe a sector of at least plus or minus 60° in bearing at approximately 45° in elevation. For a bearing direction, there is a bearing relating to the choice of radiating elements 3a, 3b, 4a, 4b, the relative phase of the signals transmitted by these elements and the amplitude distribution, such that the interrogation channel has a maximum gain and the control channel a trough around this direction. Normally, the control channel, increased by 9 dB covers all the lobes of the interrogation channel and in the interrogation direction $\theta I$ only leaves an interrogation arc $\Delta\theta I$ in the said direction. The choice of networks 3a, 3b, 4a, 4b on transmission and on reception, the choice of the relative phase of the signals transmitted by these radiating elements and their amplitude distribution for obtaining the radiation diagram as shown in FIG. 1b is ensured via switching and phase-displacement means 6 of the interrogation signal, whereby said means and the said radiating elements constitute an electronic scanning antenna. In FIG. 1a, the switching and phase-displacement means 6 are represented by a block 6 which is connected to the radome 2 by clip 7. The radio connection between the switching and phase-displacement means 6 and each of the radiating elements 3a, 3b and 4a, 4b is ensured by connectors of the coaxial cable type 8. The basic circuit for the switching and phase-displacement means 6 is given in the following description and is shown in FIG. 2. In FIG. 2, the switching and phase-displacement means 6 of the interrogation signal comprise an energy distributing circuit 200 composed of two hybrid junctions 20, 22 separated by a first phase shifting circuit 21 in the embodiment of FIG. 2. A switching circuit 23 connects the outputs of the second hybrid junction 22 to networks 3a, 3b, 4a, 4b via a second phase shifting circuit 24. A control circuit 25 of the first and second phase shifting circuit and the switching circuit 23 receiving in particular the orientation information from the transmission-reception radar antenna corresponding to the interrogation direction $\theta I$ permits the orientation in interrogation direction $\theta I$ of the radiation diagrams of the interrogation channel and the control channel by the choice of the permitted phase-displacement brought about by phase shifters 21 and 24 and by the choice of radiating elements 3a, 3b or 4a, 4b made the switching circuit 23. The depointing operations of the beams are obtained by the action of the phase shifter 24, which can be quantified. When two antennas are spaced by a distance d, the main lobe of the beam has a width $\theta_{3\,dB}=50(\lambda/d)$ in which $\lambda$ represents the transition wavelength of the interrogation signal. For a phase displacement $\Delta\phi$ the beam is displaced by:

$$\Delta\theta = \frac{\lambda}{d}\ \frac{\Delta\phi}{2\pi}$$

The above-defined zone is correctly covered if $$\Delta\theta < \frac{\theta_{3dB}}{4} \text{ i.e. } \Delta\phi \leq 75°.$$

In practice, the phase-displacement $\Delta\phi$ provided by phase shifter 24 is chosen so as to be nominally equal to $n\times 45°$, i.e. the phase shifter 24 is quantified to three bits or 8 states. The amplitude distribution is ensured by phase shifter 21. The diagrams overlap in pairs and do not have precisely the same level and the formation of a channel having a gain maximum and another having a gain minimum in the same direction necessitates unequal amplitude distribution between these two antennas. The microwave frequency circuit shown in FIG. 2 permits this distribution by means of phase shifters. The interrogation signals $\tau$ and control signal $\rho$ transmitted simultaneously are respectively transmitted to the input of the first hybrid circuit 20 by terminals I, C shown in FIG. 2.

The output signals at the test point A and B of the second hybrid circuit 22 are respectively written for the input by the interrogation channel, $$a = \frac{\eta}{2} - \frac{\eta}{2} e^{j\phi 1}$$

$$b = j\left(\frac{\eta}{2} + \frac{\eta}{2} e^{j\phi 1}\right)$$

and for the input by the control channel C $$a = j\left(\frac{\phi}{2} + \frac{\phi}{2} e^{j\phi 1}\right)$$

$$b = \frac{\phi}{2} e^{j\phi 1} - \frac{\phi}{2}$$

or the input I $$a = -j\eta\sin\frac{\phi 1}{2} e^{\frac{j\phi 1}{2}}$$

-continued $$b = j\eta\cos\frac{\phi_1}{2} e$$

and for the input C $$a = j\phi\cos\frac{\phi_1}{2} e^{\frac{j\phi_1}{2}}$$

$$b = j\phi\sin\frac{\phi_1}{2} e^{\frac{j\phi_1}{2}}$$

Thus, the relative phase between a and b is not affected by the value of $\phi_1$, the phase displacement provided by the first phase shifter 21. The energy is distributed like sine and cosine $\phi_1/2$, $\phi_1=(\pi/2)$, thus providing the equality of distribution.

Phase shifting circuit 24 which for the input by interrogation channel I puts into phase a and b (signals obtained at test points A and B of FIG. 2) in a direction $\theta I$, i.e. a sum channel in said direction, also carries out at the same time for the input by control channel C the bringing into phase opposition of phase a,b in accordance with the same direction $\theta I$, i.e. a difference channel. The microwave frequency circuit shown in FIG. 2 and formed from hybrid junctions and the phase shifter 21 thus carries out a controlled energy distribution between two antennas and supplies two simultaneous channels, one an interrogation channel and the other a control channel. Phase shifting circuit 21 can be quantified and the energy distribution can in fact be approached to within plus or minus 1 dB and the dynamics of the system can be limited to plus or minus 7 dB, so that seven phase positions are sufficient. Thus, a pair of radiating elements $3b$, $3a$ or $3b$, $4a$ or $3a$, $4a$ is selected by means of switches K1, K2 of the switching circuit 23. The radiation diagrams of these networks are then combined in amplitude and phase by means of microwave frequency circuit constituted by phase shifters 21 and 24 in such a way as to vary the position of the resulting radiating elements. This microwave frequency circuit makes it possible to form the sum (interrogation channel) and the difference (control channel) of the elementary diagrams of the two elements by imposing the desired ratio of amplitudes on the basis of a phase value given by the phase shifter 21. The pointing of the IFF interrogation direction of angle $\theta I$ in FIG. 1b is dependent on the scanning direction of radar antenna 1 by control circuit 25 receiving the pointing information $\theta I$ from the radar antenna 1. The control circuit imposes the state of phase shifters 21 and 24 and the state of switches K1, K2 of switching circuit 23. The microwave frequency circuit shown in FIG. 2 permits the pointing of a sum channel and a difference channel simultaneously in a random direction of the sector to be covered. The radiation diagram of the elements $3a$, $3b$, $4a$, $4b$ shown diagrammatically in FIG. 3a is also diagrammatically shown in FIG. 3b with respect to the sector to be covered of plus or minus 60° in bearing. However, due to the separation between the radiating elements $3a$ and $3b$, there are grating lobes in the radiation diagram of pair $3a$, $3b$. The separation between these elements is generally of the order of 2 to 3 wavelengths, which corresponds to a periodicity of the grating lobes of 30° to 20°. The existence of these grating lobes leads to an identification ambiguity, i.e. an ambiguity in the direction of the interrogation arc which must be removed. The results of a detailed study of such a system have shown that in general a number of combinations of phase-displacement values introduced by the phase-displacement circuits 21 and 24 and by the positions of switches K1, K2 of switching circuit 23 make it possible to obtain a high gain in a given direction and that these combinations have disjointed interrogation arcs in other directions. FIG. 4 illustrates these results by showing a system of coordinates, whose ordinate axis C0 represents the different combinations of different phase values of phase shifting circuits 21 and 24 and the different states of switches K1, K2 of switching circuit 23, points C1, C2, C3 corresponding in each case to a given combination and whose abscissa axis is graduated in values of $\theta$ angle of a given direction in the bearing plane with axis Z, Z' of the radomes.

Figure 5A:
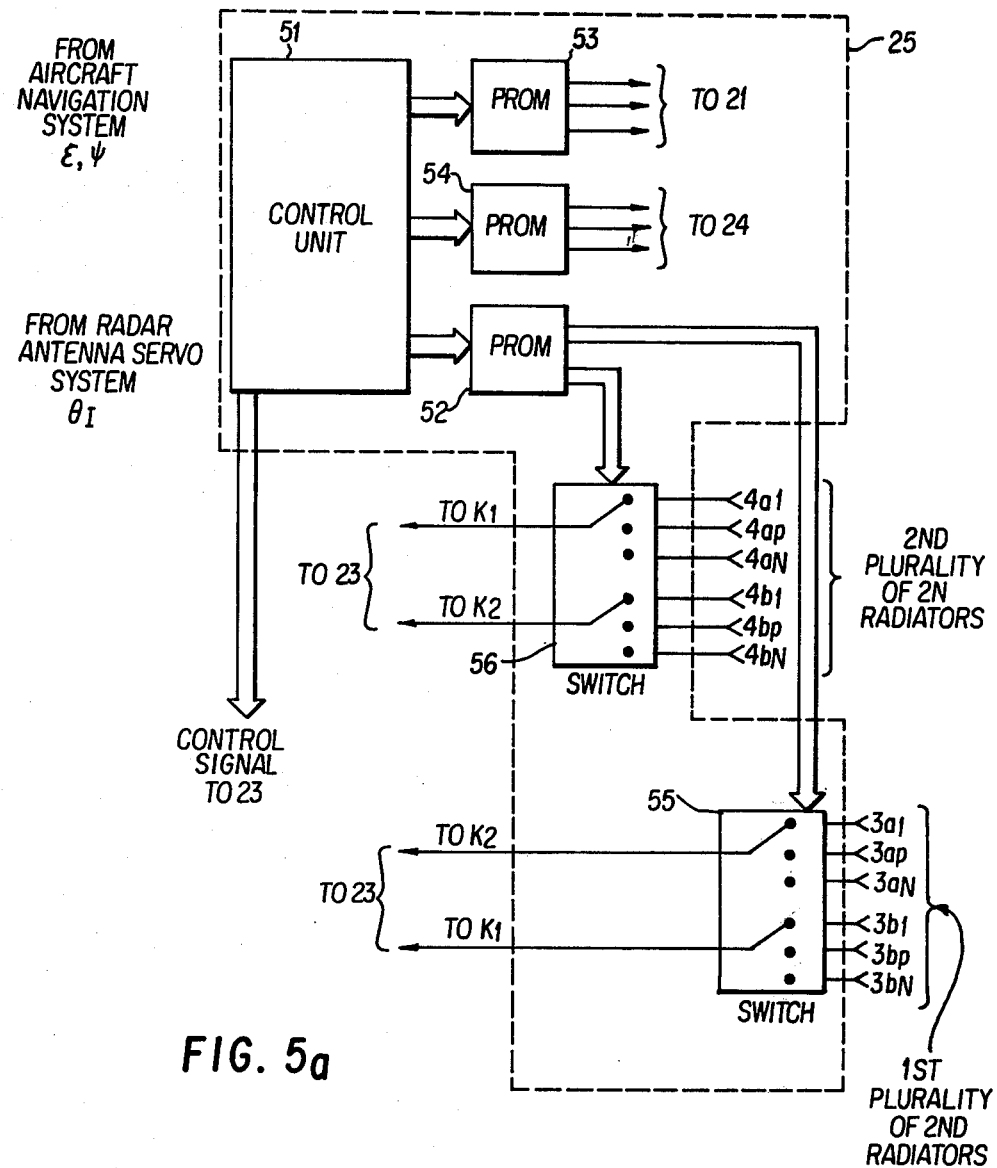
FIG. 5a a non-limitative embodiment of means controlling the switching and phase-shifting means.
Figure 5B:
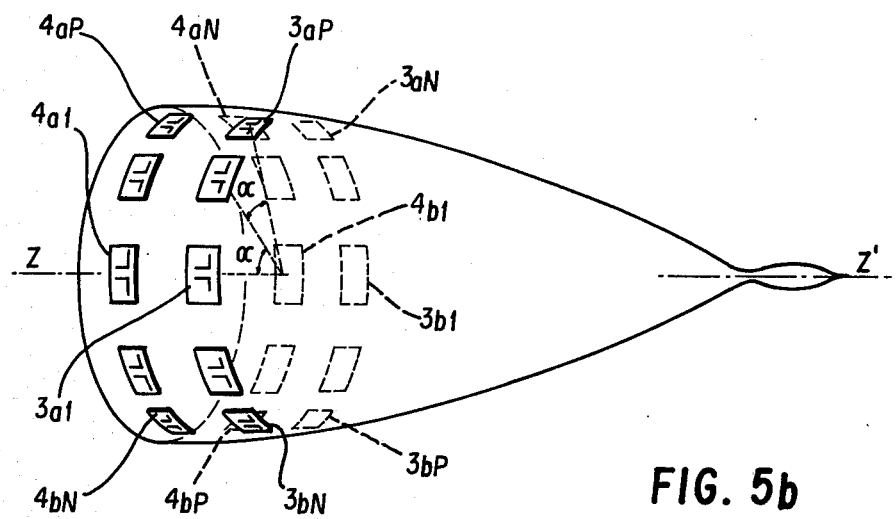
FIG. 5b a preferred, non-limitative embodiment of the interrogation system according to the invention, in particular permitting roll compensation.
Figure 6A:
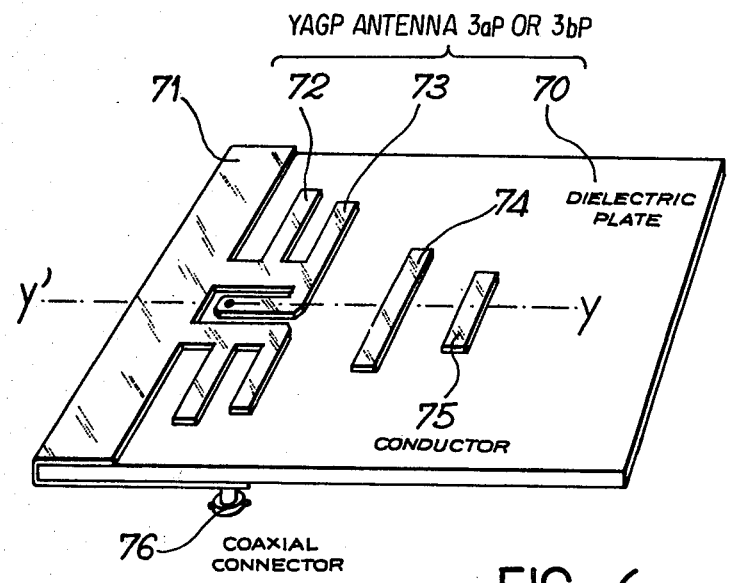
FIGS. 6a and 6b a preferred embodiment of the radiating elements constituting the interrogation antenna according to the invention.
Figure 6B:
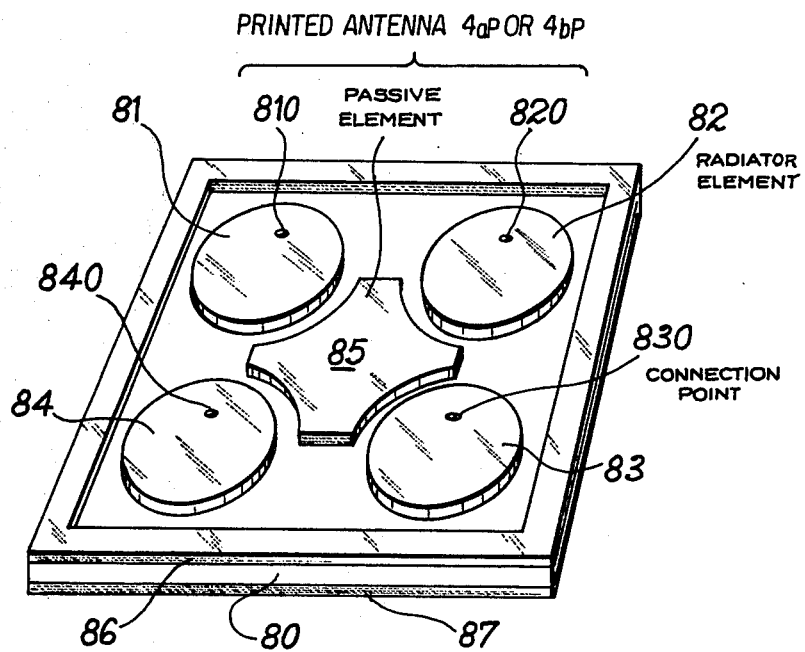

In FIG. 4, the different segments of combinations C1, C2, C3 respectively designated $\Delta\theta I1$, $\Delta\theta I2$, $\Delta\theta I3$, each represent the interrogation arc for the combinations C1, C2 and C3 respectively in the mean interrogation direction $\theta I$. These interrogation arcs $\Delta\theta I1$, $\Delta\theta I2$, $\Delta\theta I3$ define space zones in which the interrogation signal level exceeds the level of the signal of the control channel by 9 dB for the three different combinations of radiation diagrams C1, C2, C3. The only positive responses to the combinations C1, C2, C3 are contained in arcs G1, G2 on the abscissa axis, said arcs corresponding to the coincidence of the arcs associated with sequences C1, C2, C3. Thus, the system of $4 \times n1 \times n2$ possible beams with the aid of four positions of switches K1, K2 of the n1 positions of the phase shifting circuit 21 and n2 positions of the phase shifting circuit 24, a large number close to 50% is not used, a small number substantially equal to 10% is used for the observation of the lateral zones without ambiguity and the remainder for the observation of the front zone where several combinations are used for the same interrogation arc in order to remove ambiguities. Thus, by using existing combinations it is possible through the use of existing combinations to process a better selection of responsesform each direction in a logic decision circuit. However, this solution leads to a greater complexity of the control circuit and to the necessity of storing the information received. Another particularly effective solution consists of associating the responses found by the IFF system to the target detected by the radar by means of a distance discrimination. According to FIG. 5a, the phase-displacement and switching control circuit 25 of the first and second phase shifting circuits and the switching circuit 23 comprises a circuit 51 for coding the position data of the radar antenna 1 receiving a signal representative of the pointing $\theta I$ of the radar antenna. The phase-displacement and switching control circuit 25 also has programmable read-only memory circuits 52, 53, 54 containing control data from switches K1, K2 of the switching means 23 and first and second phase shifters 21, 24, taking account of the pointings of the radar antenna, the memory circuits receiving in operation signals supplied by the coding circuit and supplying control signals of the switching means 23 and the first and second phase shifters 21, 24. According to a special embodiment, the pointing data from the radar antenna $\theta I$ are supplied to the control unit 51 in digital form and this control unit 51 is constituted e.g. by a type 6800 microprocessor. Any solution consisting of using the aircraft computer for controlling the depointing of the IFF interrogation beam does not pass beyond the scope of the present invention. The switching and phase-displacement control means 25 also comprise multiple position switching circuits 55, 56. These switching circuits 55, 56 are inserted between the outputs of memory circuits 52 and the different radiating elements 3a1, 3a2, 3aP, 3aN; 3b1, 3b2, 3bP, 3bN and 4a1, 4a2, 4aP; 4b1, 4b2, 4bP, 4bN. The switching circuits 55, 56 receive from coding circuits 51 a switching control signal, as a function of the attitude parameters of the aircraft. The attitude parameters of the aircraft ε, Ψ are received by the control unit 51. Thus, for a variation in the attitude parameter ε, Ψ of the aircraft, the control unit 51 controls the switching of switching circuits 55, 56 and the radiation by the adjacent radiating elements deduced from the radiating element before modification of the attitude parameters with a given number of angular pitches α. Such a system makes it possible to keep the IFF antenna radiating in the bearing plane, taking account of the aircraft roll angle. Such an antenna is shown in FIG. 5b in which the interrogation antenna according to the invention comprises a plurality of first and second sets of radiating elements. Each couple of pairs of radiating elements 4aP, 4bP, 3aP, 3bP is arranged on a guide line of the radome with a given angular pitch α. The switching of the radiation to a couple of pairs of radiating elements makes it possible to maintain the radiation diagram of the antenna in the bearing plane, taking account of the roll attitude of the aircraft. According to FIGS. 6a and 6b, the elements constituting the first and second pairs of radiating elements are formed by printed circuits. According to FIG. 6a the elements 3a, 3b are preferably constituted by a Yagi antenna. Yagi antennas are formed, preferably on a dielectric substrate 70 by parallel conduction bands permitting the axis Y'Y for an axis of symmetry in the plane of the substrate. The conduction bands 72, 73 are directly connected to a references mass plane 71 and constitute respectively the reflector and dipole of the Yagi antenna. Two conduction bands 74 and 75 respectively constitute the directors of the Yagi antenna. The dipole constituted by conduction bands 73 is supplied by a coaxial connector 76, whose external conductor is connected to the mass plane 71 and the central core is connected to the conduction band 73 forming the dipole. The realisation of a Yagi antenna according to the invention for an IFF antenna operating band between 1000 and 1100 MHz (band L) has made it possible to obtain a radiation diagram in the plane H having an opening of approximately 60° at −3 dB and minor lobes at a level of −20 dB with respect to the radiation maximum. The gain resulting from such an antenna is approximately 8.5 dB. According to FIG. 6b, the radiating elements 4a, 4b are constituted by printed circuits having four circular radiators 81, 82, 83, 84 and a central passive element 85 arranged on a first phase of a dielectric substrate 80. The circular radiators 81, 82, 83, 84 have their geometrical centre preferably at the apex of a square. The central passive element 85 is positioned at the centre of the square and preferably has a symmetry with respect to the diagonals of this square. The circular radiators 81, 82 83, 84 are transversely supplied by conductors which are not shown in FIG. 6b and which traverse the dielectric substrate 80. The connection points of each circular radiating element and of the supply conductor are indicated by points 810, 820, 830 and 840 for radiators 81, 82, 83, 84 respectively. The position of this connection point with respect to the centre of each radiator makes it possible to define the polarization direction of the electrical field radiated by each radiator. A second face of the dielectric substrate opposite to the first face is coated with a mechanical member 87 permitting the passage of the supply conductors of the circular radiators. The realisation of such a printed antenna has made it possible to obtain the following results: The radiation diagrams (plane H) have an opening at half-power of approximately 60° and a depointing with respect to the aircraft axis of 65°. The radiation diagram (plane E) has a half-power opening of 70°. The gain obtained by realising such an antenna is approximately 8.5 dB. Such a printed antenna in particular makes it possible to obtain a small radiating element through the choice of the distance separating the circular radiators with a view to obtaining the sought radiation diagram and by the addition of the passive central element. Such a printed antenna is not prejudicial to the location thereof on the radome or, as stated hereinbefore, on the supporting ferrule of the radome.

Thus, an airborne interrogation system has been described making it possible to transmit an interrogation signal and a control signal simultaneously and the reception of two channels simultaneously. Any embodiment having a particular number of IFF transmission radiating elements does not pass beyond the scope of the invention. In particular, any embodiment permitting, in addition to a scanning in bearing, a scanning in a plane perpendicular to the bearing plane such as the site plane does not pass beyond the scope of the invention. The embodiment of FIG. 5b makes it possible to obtain interrogation data in a plane perpendicuar to the bearing plane by only supplying two sets of pairs of radiating elements such as 3a1, 3b1, 4a1, 4b1 and 3aP, 3bP, 4aP, 4bP arranged symmetrically to the Z,Z' axis and in a plane perpendicular to the bearing plane. The only modification necessary for such an operation is, in this case, made to the switches K1, K2 of the switching means 23, said switches K1, K2, being replaced by switches making it possible to supply in parallel radiating elements 3aP, 3bP, 4aP, 4bP. In the same way, a roll compensation, taking account of the aircraft attitude parameters ε, Ψ can also be obtained, whereby in this case the modification of switches K1, K2 is carried out at switches K1 1, K1 P, K1 N, K2 1, K2 P, K2 N. In this case, the rotation by an angle α is equal to the displacement pitch of the radiating elements on a guideline of the radome permits the simultaneous rotation of two pairs of radiating elements arranged in the site and bearing plane.

What is claimed is:

1. An interrogation system, for an airborne radar which includes an antenna enclosed in the aircraft nose protected by a radome, comprising:

an interrogation antenna decoupled from said radar antenna and including a first pair of radiating elements the first and second radiating elements of which are of a same first type and which are arranged laterally on the wall of the aircraft nose, symmetrically with respect to the axis of revolution of the aircraft nose;

means for delivering to said interrogation antenna a microwave interrogation signal and control signal, and means for switching and phase shifting said interrogation and control signals, said switching and phase shifting means and the first and second radiating elements of the first pair forming an electronic scanning antenna wherein said means for switching and phase shifting the interrogation signal includes a first means for distributing the amplitude, in series with second means for disaiming the radar beam and a third means for controlling said first and second means wherein said third means includes in series a first circuit for coding the information defining the aiming position of the radar antenna and a set of PROM memories containing control information and delivering to the first and second means control signals depending on the aiming of the radar antenna.

2. An interrogation system according to claim 1, where in the electronic scanning interrogation antenna further comprises a plurality of (N−1) pairs of radiating elements identical to the first and second radiating elements of the first pair, arranged on the wall of the aircraft nose with their center of phase on a circle in a plane perpendicular to the axis of revolution of the aircraft nose with an angular pitch $\alpha$ between two adjacent ones.

3. An interrogation system according to claim 2 wherein the third means further comprises:
a first switching circuit for selecting one of the N pairs of radiating elements of the first type depending on the coded attitude parameters of the aircraft and roll stabilizing the interrogation antenna in the bearing plane.

4. An interrogation system according to claim 3 wherein said first switching circuit is an N-position controllable switch.

5. An interrogation system according to claim 4, wherein each one of the second and/or first switching circuits further includes switches for also supplying in operation the pair of radiating elements the center of phase of which is in the plane perpendicular to the bearing plane and forming an electronic bearing and elevation scanning antenna.

6. An interrogation system according to claim 1, wherein the first and second, radiating elements of the first pair respectively have associated on the same guide line of the aircraft nose a third, and fourth, radiating element respectively of a second type, which are arranged on the wall of the aircraft nose farther from the point thereof than said first and second radiating elements.

7. An interrogation system according to claim 6, wherein the electronic scanning interrogation antenna further comprises a plurality of first and second, (N-1) pairs of radiating elements which are identical with the first and second, radiating elements and are arranged on the wall of the aircraft nose with their center of phase on a circle in a plane perpendicular to the axis of revolution of the aircraft nose wtih an angular pitch $\alpha$ between two adjacent ones of the same pair.

8. An interrogation system according to claim 7, wherein the third means further comprises:
a first and a second switching circuit for selecting one of the N pairs of the first and of the second plurality of radiating elements of the first and second type respectively as a function of the coded attitude parameters on the aircraft in the bearing plane.

9. An interrogation system according to any one of claims 6 or 7, wherein the means for switching and phase shifting the interrogation signal therefor further comprises:
a fourth means for switching the radiating elements, and selecting two of them, said first, second and fourth means being controlled by said third means.

10. An interrogation system according to claim 9, wherein the fourth means is composed of a first switch K1 and a second switch K2 for selecting a couple of radiating elements constituted by a first and a second, or a first and a third or a second and a fourth radiating elements among the radiating elements of the first and the second types.

11. An interrogation system according to claim 6 wherein each radiating element of a pair of the second type is a so-called plate-type antenna.

12. An interrogation system according to claim 9, wherein the second means is composed of a phase shifter controlled by the third means.

13. An interrogation system according to claim 12 wherein the phase shifter is quantified.

14. An interrogation system according to claim 1 wherein the radiating elements of a pair of the first type radiate in the direction of the axis of the aircraft nose.

15. An interrogation system according to claim 14 wherein each radiating element of a pair of the first type is a Yagi antenna of a printed circuit.

* * * * *